United States Patent [19]
Kaneko

[11] 4,103,316
[45] Jul. 25, 1978

[54] APPARATUS FOR PREVENTING THE OCCURRENCE OF POSSIBLE TRANSIENT PHENOMENA IN AN ELECTRIC POWER TRANSMISSION CIRCUIT

[75] Inventor: Yoshiaki Kaneko, Kawasaki, Japan

[73] Assignee: Sanki Denshi Kogyo Kabushiki Kaisha, Yokohama, Japan

[21] Appl. No.: 796,484

[22] Filed: May 12, 1977

[51] Int. Cl.² .......................................... H01H 33/59
[52] U.S. Cl. ........................................ 361/3; 361/5; 361/6; 361/74
[58] Field of Search ..................... 361/3, 5, 6, 7, 71, 361/74, 75, 86, 87, 100

[56] References Cited

U.S. PATENT DOCUMENTS

| | | | |
|---|---|---|---|
| 3,976,917 | 8/1976 | Fork | 361/86 X |
| 3,990,000 | 11/1976 | Digneffe | 361/3 X |
| 4,001,643 | 1/1977 | Ramberg et al. | 361/6 X |

FOREIGN PATENT DOCUMENTS 30,782  10/1967  Japan ...................................... 361/6

*Primary Examiner*—Harry E. Moose, Jr.
*Attorney, Agent, or Firm*—Haseltine, Lake & Waters

[57] ABSTRACT

Apparatus for preventing the occurrence of possible transient phenomena in the circuit including a power source and its load connected thereto when the supply of electric power from the power source to the load, which has been interrupted, is restarted. The apparatus includes means for detecting the occurrence of the interruption of the power supply and means for memorizing the phase angle of the voltage or current of the power source at the time of the occurrence of the interruption of the power supply to maintain the circuit in off-condition. The apparatus further includes means for detecting the coincidence of the phase angle memorized in the memorizing means with a changing phase angle of voltage or current of the power source after the resupply of the electric power from the source to the load becomes possible whereby, upon detecting the coincidence, resupply of the electric power from the power source to load will be restarted.

12 Claims, 12 Drawing Figures

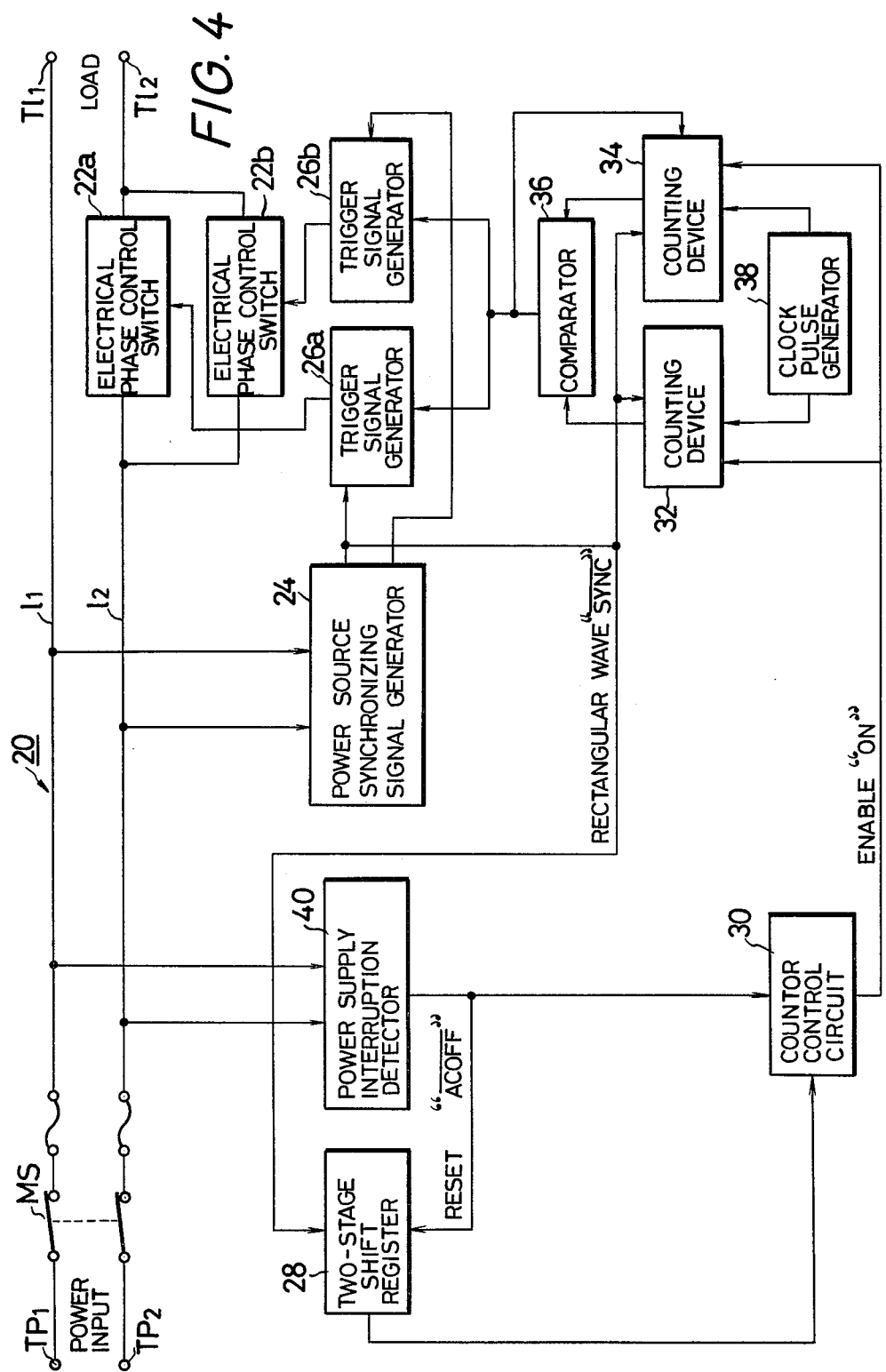

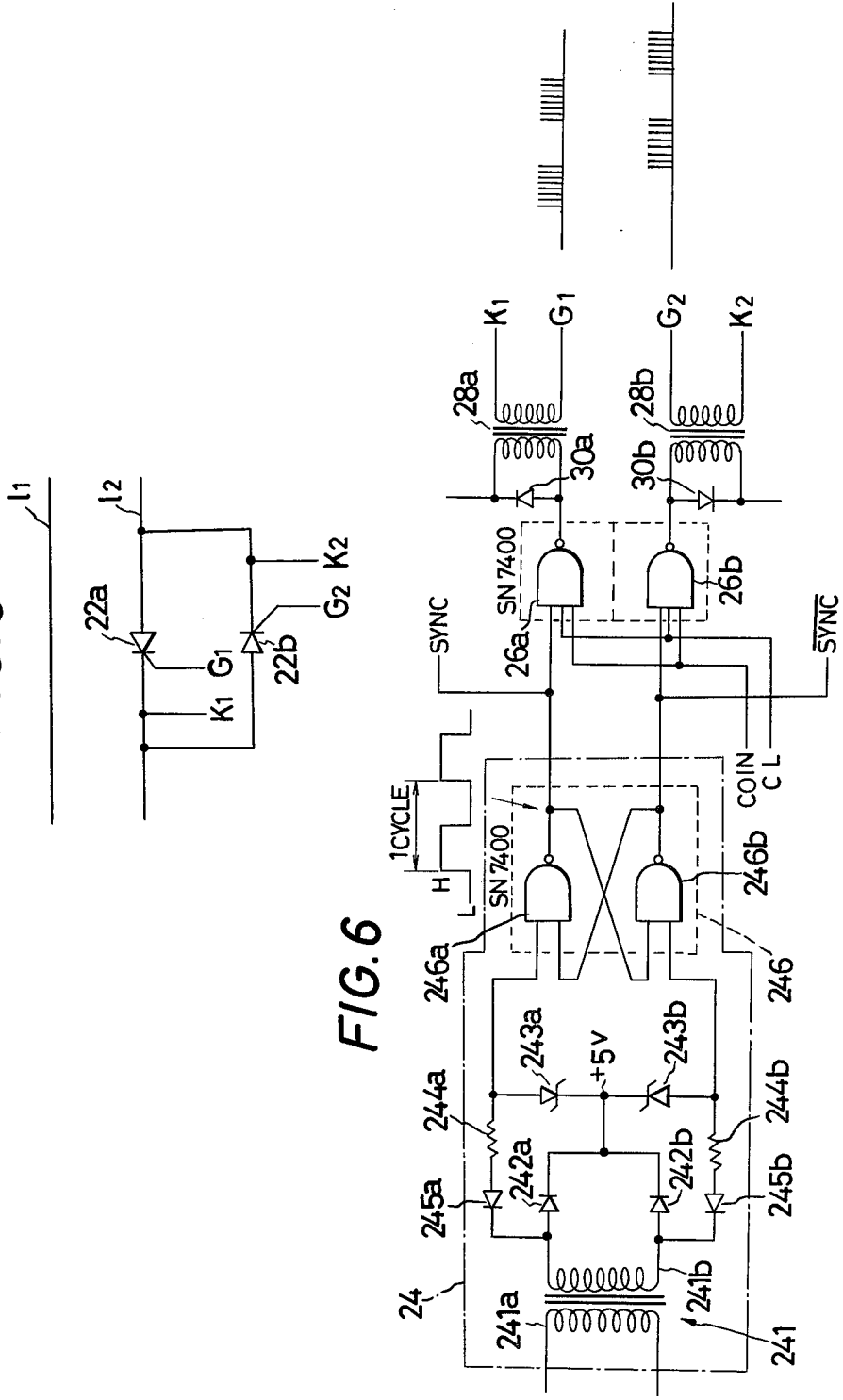

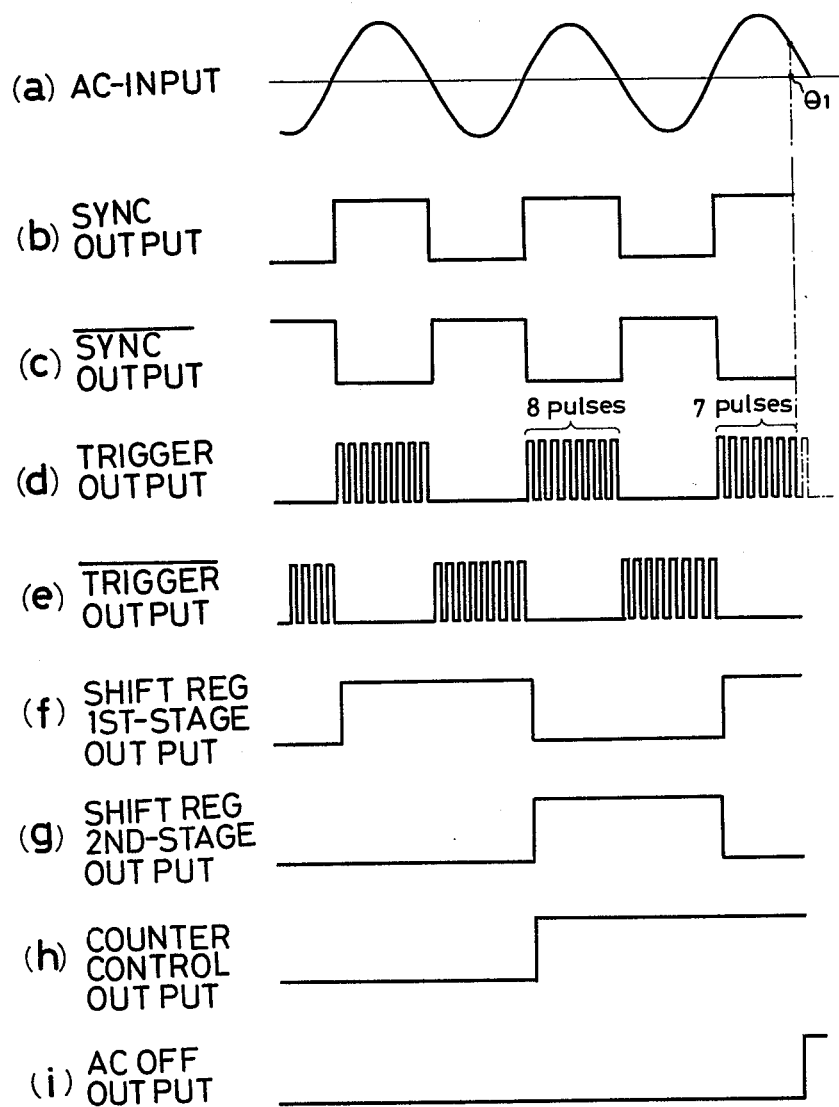

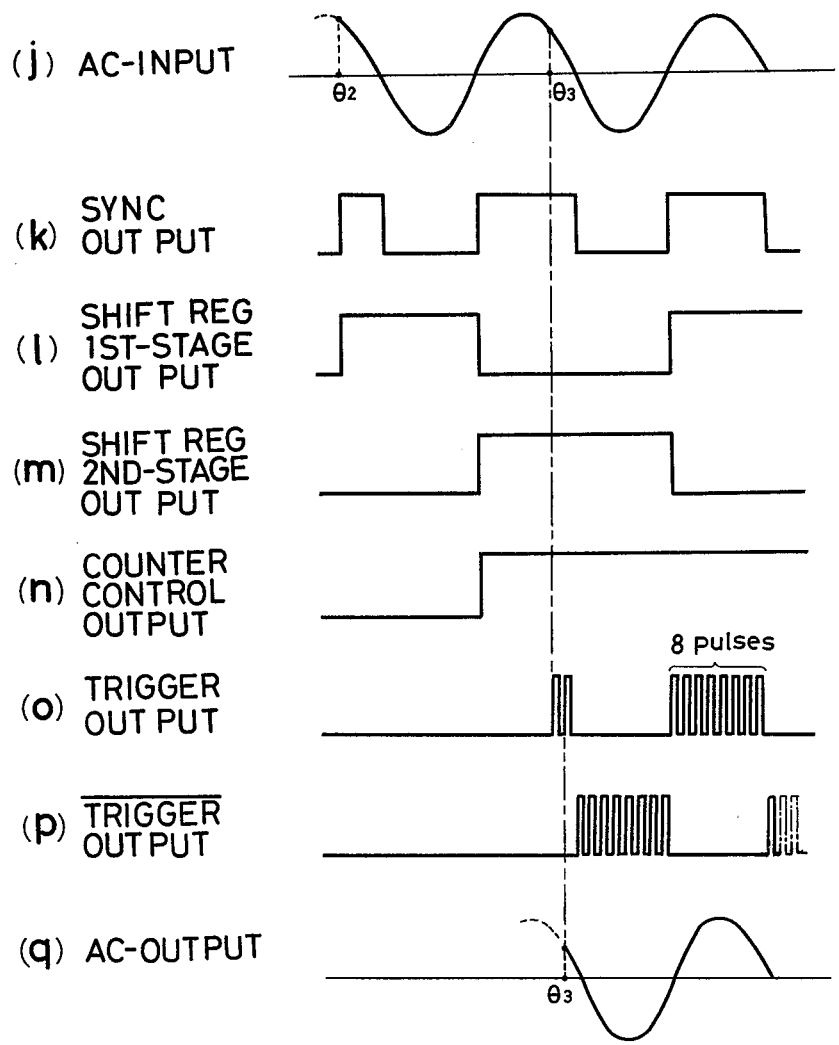

APPARATUS FOR PREVENTING THE OCCURRENCE OF POSSIBLE TRANSIENT PHENOMENA IN AN ELECTRIC POWER TRANSMISSION CIRCUIT

BACKGROUND OF THE INVENTION

The present invention relates to an apparatus for switching control of an alternating current power source connected to alternating current loads such as AC-welders, magnetizers or elevators and, more particularly, to an apparatus for preventing the occurrence of possible transient phenomena in the circuit including an AC-power source and its loads owing to the interruption and, a short time later, recovery of the supply of electric power from the power source to the loads, for example, by the opening or breaking and a short time later re-making or reclosing of the circuit of the AC-power source, or by the occurrence of and, a short time later, recovery from a short circuit on the side of the power source.

AC loads such as mentioned above are often used in such a manner that the circuits of the power sources are repeatedly opened and closed at relatively short internals of time to accompany the occurrence of transient phenomena such as circulate a relatively high current through the circuit, depending upon circumstances. This may lead to the occurrence of accidents such as burning of circuit elements.

Assume that the load includes a transformer which has an iron core exhibiting a typical magnetic hysteresis loop. If the circuit including a commercial AC power source and its load connected thereto is broken or opened at a time when, for example, a first positive-going half of a cycle of the source current has elapsed, a residual magnetism will remain in the iron core. If the circuit is re-made or reclosed exactly at a time when a second, or immediately succeeding, negative-going half of the cycle has elapsed, the source current will flow for a third half cycle succeeding the second half cycle in the same sense as the current which has produced the residual magnetism in the core. Because the excitation impedance is very low because the residual magnetism acts to help the source current to flow in the circuit for the third half cycle, the source current instantaneously has a far higher value than its expected steady-state one. For a fourth half cycle succeeding the third half cycle and having the negative-going sense, the source current may now flow with a much lower magnitude than its steady-state one because the residual magnetism adversely acts on the source current. The residual magnitude will gradually decrease with the lapse of time. The alternately positive- and negative- going swings of the AC source current will gradually reach their steady-state values.

It is the same with the case where the circuit including the power source and the load is broken or opened at a time when the source current has depicted a first sinusoidal half of a cycle in the opposite sense, i.e., in the negative-going sense, and it is re-made or reclosed after the lapse of a second half cycle succeeding the first half one.

On the other hand, assume that a capacitive load is connected to the power source instead of the inductive load. If the circuit including the power source and the load is broken or opened and then re-made or reclosed before the charge stored in the load ends its self-discharge, a transient source current in excess of the expected steady-state value may flow in the circuit, provided that the source and the charged load have the same direction of electromotive force in the circuit.

In the case of inductive loads having relative large inductances such as iron-core transformers or induction motors, the time required for the residual magnetism to be lost often reaches 5 to 10 sec. or more. In the case of capacitive loads, the time required for the residual charge to be lost often reaches several to tens of seconds.

If the circuit including a power source and its load, inductive or capacitive, is broken at a time when a first half of a cycle of the source current, for example, in the positive-going sense ends and if it is then re-made or reclosed at a time when a whole cycle of the source current immediately succeeding the first half cycle has elapsed from the time when the circuit has been broken, the source current will begin to flow in the negative-going sense. In this case, the current will have the direction to cancel the residual magnetism thus far stored. Therefore, the excitation impedance is very high so as to produce no transient current.

Of the time elapsing from the breaking or opening of the circuit including a power source and its load, inductive or capacitive, to the re-making or reclosing thereof, is an odd number multiple of half of the period of the source current, a transient source current having a magnitude instantaneously larger than its expected steady-state value may flow in the circuit in a positive- or negative- going sense, depending upon the polarity of the residual magnetism. On the other hand, if the time from the breaking or opening of the circuit to the re-making or reclosing thereof is an integral multiple of the period of the source current, no transient source current would flow.

The above has been carried out on the example where the circuit including the power source and the load is broken or opened and then re-made or reclosed, respectively, at phase angles of the source current where the source current becomes zero, such as 180° and 540°. However, even when the circuit is broken or opened at any phase angle of the source current and then re-made or reclosed at another phase angle, similar results would be obtained so long as the difference between the phase angles of the voltage or current at the times of the breaking or opening and of the re-making or reclosing of the circuit is 360° or its integral multiple.

It is the same with the case in which the supply of power, which has been interrupted owing to a short-circuit on the side of the power source, restarts in a short time.

SUMMARY OF THE INVENTION

An object of the present invention, therefore, is to provide an apparatus for preventing the occurrence per se of transient phenomena in the circuit including an alternating current power source and a load connected thereto when the supply of an electric power from the power source to the load, which has been interrupted, is restarted, instead of providing means for coping with transient phenomena already produced.

A main feature of the present invention is that the time elapsing from the interruption to the later recovery of the power supply is selected to an integral multiple of the period of the source current or voltage to make the phase angles of the current or voltage coincide at the times of the interruption and the recovery.

Briefly, the apparatus according to the present invention comprises switching means provided in the circuit including an alternating current power source and a load connected thereto between the power source and the load; means for generating trigger signals to operate the switching means in synchronization with the voltage or current of the power source in order that the power is supplied from the power source to the load in a smooth manner; means for detecting a possible occurrence of interruption of the power supply; means responsive to the detection of the interruption of the power supply by the detecting means for memorizing the phase angle of the current or voltage of the power source at the time of the occurrence of the interruption of the power supply to stop the operation of the trigger signal generating means and therefore to turn off the switching means; and means for detecting the coincidence of the phase angle memorized in the memorizing means with a changing phase angle of the voltage or current of the power source after the power supply from the power source to the load is enabled again to restart the operation of the trigger signal generating means and therefore the switching means at the time of detecting the coincidence.

Other features and advantages of the present invention will be apparent from the following description in combination with the accompanying drawings wherein:

BRIEF DESCRIPTION OF THE DRAWINGS

FIG. 4 shows a block diagram of an apparatus according to the present invention;

FIG. 5 shows a connection diagram of electrical phase control switches connected to one of the power transmission lines;

FIG. 6 shows a circuit diagram of a power source synchronizing signal generator and a pair of trigger signal generators connected thereto which constitute part of the present invention;

FIGS. 11A and 11B show time charts explaining the operation of the apparatus of the present invention.

DESCRIPTION OF THE PREFERRED EMBODIMENT

Figure 1:
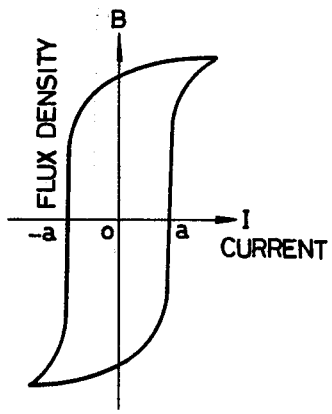
FIG. 1 shows a hysteresis loop of a general iron core of an inductive load.
Figure 2:
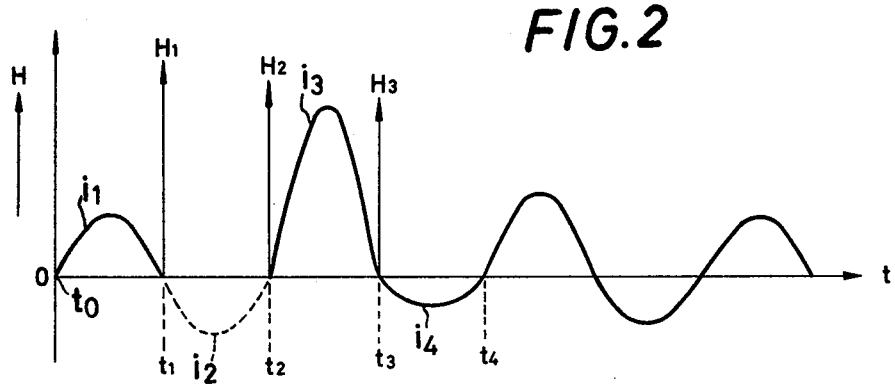
FIG. 2 shows a voltage or current curve including a possible transient phenomenom produced when the breaking or opening and then the re-making or reclosing of the circuit including an AC power source and the load connected thereto are effected.

For a better understanding of the present invention, first, description will be made of possible transient phenomena occurring in the circuit including an AC power source and a load connected thereto due to the interruption and, a short time later, recovery of power supply from the power source to the load. Assume that the load is a general transformer which has an iron core exhibiting a magnetic hysteresis loop such as shown in FIG. 1. Referring to FIG. 2, if the circuit of the power source is broken or opened at a time $t_1$ when the AC source current has ended its first, for example positive-going, half cycle $i$ with a zero value, a residual magnetism $H_1$ will exist in the iron core. If the circuit of the power source is again made or closed exactly at a time $t_2$ when the source current has ended its second, assumed, negative-going half cycle $i_2$ following the first half cycle, the source current will flow for a third half cycle $i_3$ following the second half cycle, in the same sense as the current which brought about the existence of the residual magnetism $H_1$ in the core. Because the excitation impedance at that time is very low owing to a residual magnetism $H_2$, the source current will have a magnitude far higher than its expected steady state value. For a fourth, negative-going half cycle $i_4$ following the third half cycle, the source current may now have a magnitude much lower than its steady-state value owing to a residual magnetism $H_3$. The residual magnetism will gradually decrease with the elapse of time, as shown at $H_1$, $H_2$, $H_3$, ... in FIG. 2.

Figure 3:
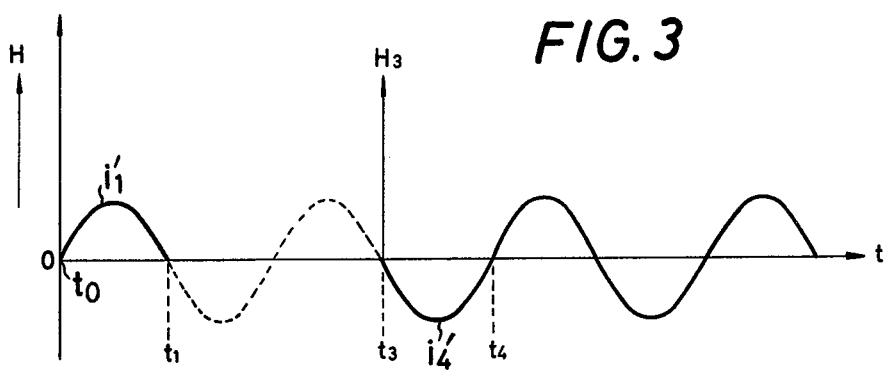
FIG. 3 shows a voltage or current curve including no transient phenomena and illustrating the principle of the present invention.

Referring to FIG. 3, one aspect of the present invention is shown. If the circuit including the power source and the load is broken or opened at a time $t_1$ when for example a positive going half $i'_1$ of a cycle of the source current has elapsed and then if it is re-made or reclosed at a time $t_3$ when the succeeding whole cycle between $t_1$ and $t_3$ of the current has elapsed from the time $t_1$, the source current will begin to flow in the negative-going sense for the half cycle $i'_4$ between $t_3$ and $t_4$, as shown in the solid line. In this case, the current will have the direction to cancel the residual magnetism $H_3$ thus far stored. It will flow as if it were a steady-state current so as to produce no transient current.

Referring now to FIG. 4, this block diagram shows a preferred embodiment of an apparatus for preventing transient phenomena according to the present invention. The apparatus, generally denoted at 20, is shown as being connected to a pair of power transmission lines $l_1$ and $l_2$. A commercial AC power source for example at 50 Hz (not shown) is connected to the left ends $TP_1$, $TP_2$ of the lines and the load (also not shown) to the right ends $Tl_1$, $Tl_2$ of the lines, as seen in the diagram. The line $l_1$ includes a main source switch MS in the circuit thereof.

A pair of electrical phase control switches 22a and 22b are provided in the circuit of the line $l_2$. The pair of electrical phase control switches, each of which may be, for example, a reverse blocking triode thyristor, are connected in parallel with opposite polarities, as shown in FIG. 5. They may be a single bidirectional triode thyristor such as TRIAC.

A power source synchronizing signal generator 24 has a pair of inputs connected to the lines $l_1$ and $l_2$. The generator 24 is adapted to generate a pair of rectangular wave trains displaced 180° in phase angle from each other, shown in FIG. 11A-*b* and *c*, and synchronized with the frequency of the power source, shown in FIG. 11A-*a*.

Referring to FIG. 6, there is shown the details of the synchronizing signal generator 24. The generator has a transformer 241 wherein the primary winding 241a is adapted to be connected to the AC power source and the secondary winding 241b is respectively connected to the anodes of a pair of diodes 242a and 242b connected together at their cathodes. A pair of Zener diodes 243a and 243b are connected together at their cathode sides. The cathodes of the diodes 242a and 242b and those of the Zener diodes 243a and 243b are connected in common and clamped at a predetermined potential level of +5 volts. The respective annodes of the Zener diodes 243a and 243b, each having a Zener voltage of about 5 to 6 volts, connected through corresponding constant-current forming resistors 244a and 244b of relatively high resistance and corresponding diodes 245a and 245b, opposite to the Zener diodes 243a and 243b in polarity, to the terminals of the secondary winding 241b.

The anode sides of the Zener diodes 243a and 243b are connected to inputs of a shaping circuit in the form of a well-known flip-flop 246, for example, consisting of a pair of NAND gates 246a and 246b cross-connected in the well known manner. The flip-flop is adapted to normally produce a pair of rectangular wave trains opposite in phase angle in synchronization with the frequencies of the power source. For example, assume that a voltage is induced in the secondary winding 241b in such a polarity that the anode side of the upper diode 242a is higher in potential than that of the lower diode 242b. If the induced voltage reaches a value sufficient to overcome the Zener voltage of the Zener diode 243b, the Zener diode 243b will begin to conduct. This will cause the potential at the input of the NAND gate 246b to be substantially zero, thereby to toggle the outputs of the flip-flop 246. In this case, the circuit portion consisting of the diode 242b, the Zener diode 243a, the resistor 244a and the diode 245a connected in series, is maintained non-conductive. The succeeding half cycle of the AC-power source will now cause the circuit just mentioned to bring to substantially zero the potential level at the anode of the Zener diode 243a. This will toggle the outputs of the flip-flop 246. Simultaneously, the current will no longer flow through the circuit consisting of the diode 242a, the Zener diode 243b, the resistor 244b and the diode 245b connected in series. Thus, the flip-flop produces a pair of rectangular wave pulse trains SYNC and $\overline{SYNC}$ opposite in phase angle, as shown in FIG. 11A-b and c, respectively, and synchronized with the positive- and negative-going senses of the AC power source.

Referring to FIGS. 4, 5 and 6, a pair of trigger signal generators 26a and 26b, each consisting of a NAND gate, are adapted to be responsive to the outputs of the synchronizing signal generator 24 and produce corresponding trigger signals between the respective gates $G_1$, $G_2$ and cathodes $K_1$, $K_2$ of the triode thyristors 22a and 22b. Corresponding pulse transformers 28a and 28b, having surge absorber diodes 30a and 30b across their primary windings, may be provided between the trigger signal generators 26a and 26b and the switches 22a and 22b, respectively.

In addition to the input signals from the synchronizing signal generator 24, the trigger signal generators 26a and 26b are adapted to receive as its inputs clock pulses CL and coincidence signals COIN which will be described hereinafter in more detail. Thus, the outputs from the trigger signal generators 26a and 26b are such that they are 180° out of phase from each other, each of which outputs consists of eight pulses spaced at equal internals for the term of each other half cycle of each of the rectangular wave trains of the pair from the synchronizing signal generator, as shown in FIG. 11A-d and e.

Figure 7:
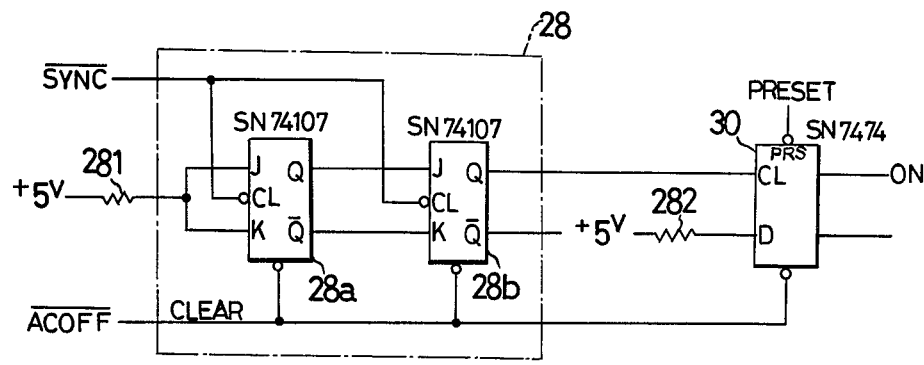
FIG. 7 shows a connection diagram of a shift register and a counter control circuit connected thereto which constitute part of the present invention.

Referring to FIGS. 4 and 7, a shift register 28 is shown as consisting of two J-K type flip-flops 28a and 28b which are connected in cascade and respectively adapted to receive as the input signal or shift pulses the train of the rectangular waves $\overline{SYNC}$ from the synchronizing signal generator 24, more particularly, from the flip-flop NAND gate 246b thereof to produce the outputs shown in FIGS. 11A-f and g, respectively. The flip-flops 28a and 28b are further adapted to receive as the reset signal an $\overline{ACOFF}$ signal from a power supply interruption detector which will be described hereinafter in more detail. The first flip-flop 28a has the J and K terminals connected through a resistor 281 to a potential of 5 volts.

In the same Figures, a counter control circuit 30, which may consist of a D-type flip flop, is adapted to receive an control input from the shift register 28 and to produce a lasting count enable signal ON, as shown in FIG. 11A-h. The D input terminal of the flip-flop 30 is connected through a resistor 282 to a potential of 5 volts.

Figure 8:
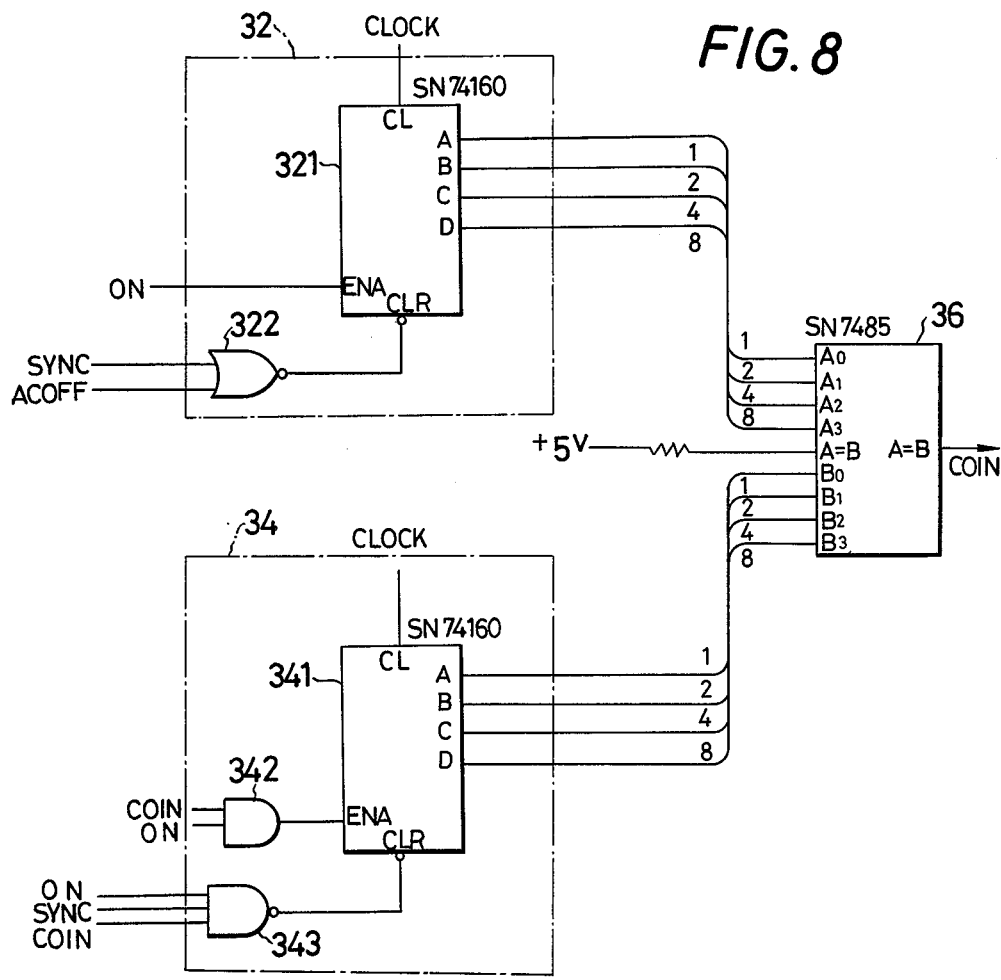
FIG. 8 shows a connection diagram of a pair of counting devices and a comparator connected thereto which constitute part of the present invention.

Referring to FIGS. 4 and 8, there are shown a pair of counting devices 32 and 34. The counting device 32 includes a synchronous hexadecimal counter 321 which is adapted to count clock pulses from a clock pulse generator which will be described hereinafter in more detail and to send its output, for example, of four bits to a comparator 36. The counting device 32 further includes a NOR gate 322 which is adapted to generate a reset output to the counter 321 by receiving as the inputs the SYNC signal from the synchronizing signal generator 24 and an ACOFF signal from the power supply interruption detector 40 to be described hereinafter in more detail. The counter 321 is adapted to receive the count enable input ON from the count control circuit 30.

The counting device 34 includes a synchronous hexadecimal counter 341 of the same type as the counter 321. The counter 341 is adapted to count clock pulses from the clock pulse generator 38 and to generate a four-bit output to the comparator 36. The counting device 34 further includes an AND gate 342 which will receive ON and COIN inputs from the counter control circuit 30 and the comparator 38, respectively, and which is adapted to produce a count enable input to the counter 341. The counting device 34 still further includes a NAND gate 343 which will receive three inputs ON, SYNC and COIN from the counter control circuit 30, the synchronizing signal generator 24 and the comparator 38, respectively, and which is adapted to produce a reset input to the counter 341.

The comparator 36 shown in FIGS. 4 and 8 is adapted to compare the counts from the counting devices 32 and 34 and to produce a COIN output, when the counts coincide, to the trigger signal generators 22a and 22b described hereinbefore.

Figure 9:
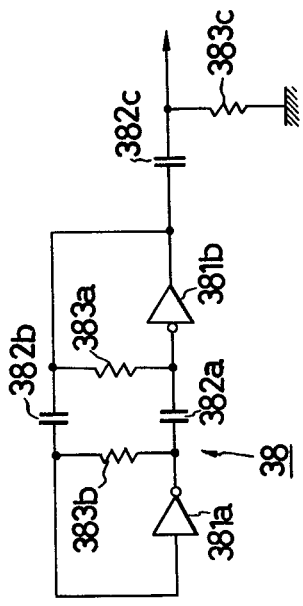
FIG. 9 shows a connection diagram of a clock pulse generator used with the embodiment of the present invention.

Referring now to FIGS. 4 and 9, they show the details of the clock pulse generator 38 referred to above.

The clock pulse generator 38 is composed of a pair of inverters 381a and 381b connected through a first differential circuit consisting of a capacitor 382a and a resistor 383a, a second differential circuit consisting of a capacitor 382b and a resistor 383b and connecting the inverters 381a and 381b in feedback relationship, and a third differential circuit consisting of a capacitor 382c and a resistor 383c connected at the output of the inverter 381b. The generator 38 is one of the well-known type. In the particular embodiment, the values of the capacitors 382a, and 382b and the resistors 383a and 383b are selected so that the period of each of the clock pulse signals generated from the generator is equal to (1/16x$f$) where $f$ is 50 or 60 to 400 Hz.

Figure 10:
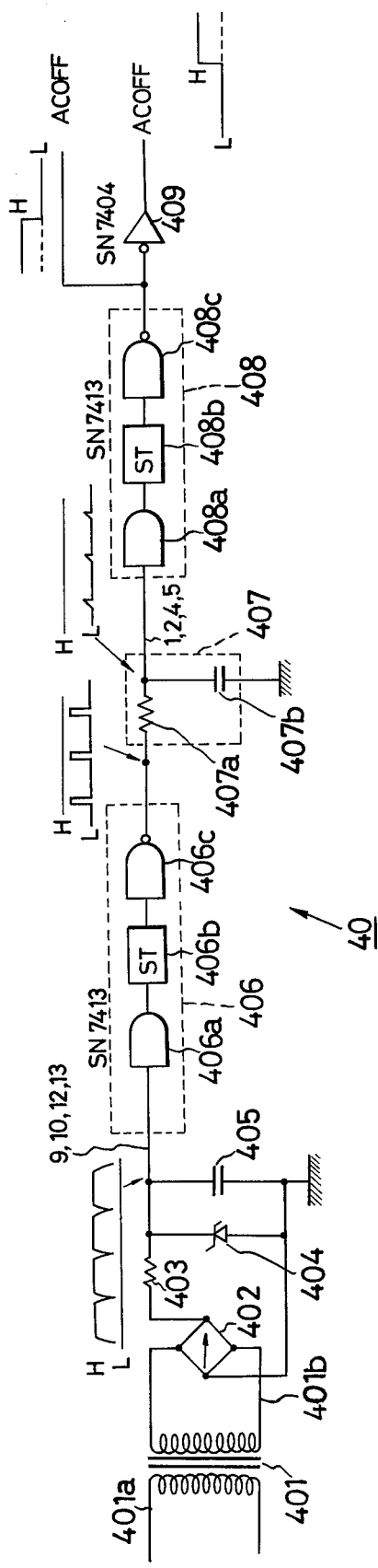
FIG. 10 shows a connection diagram of a power supply interruption detector which constitutes part of the present invention.

Referring to FIGS. 4 and 10, there is shown the power supply interruption detector 40 referred to above. This detector 40 consists of a transformer 401 whose primary winding 401a is adapted to be connected to the power source while the secondary winding 401b is connected to a full wave rectifier 402. This rectifier is connected through a resistor 403 to a clipping Zener diode 404 and a holding capacitor 405 connected in parallel with the diode 404.

The time constant defined by the resistor 403 and the capacitor 405 is selected so that the bottoms of the dips in the clipped wave form are higher than a zero level, as shown above the upper junction point of the capacitor 405, and so that it fails to result in a relatively large response delay: in other words, the time constant is selected at a value not larger than the period of the clock pulses from the clock pulse generator and the particular value of the time constant is 1 mm sec.

The capacitor 405 is connected through a first Schmitt trigger circuit 406 consisting of an AND gate 406a whose input terminals 9, 10, 12 and 13 are connected together, a Schmitt trigger 406b and a NAND gate 406c connected in cascade, an integrating circuit 407 consisting of a resistor 407a and a capacitor 407b to a second Schmitt trigger circuit 408 having the same structure as the first Schmitt trigger circuit: an AND gate 408a whose input terminals 1, 2, 4 and 5 are connected together, a Schmitt trigger 408b and a NAND gate 408c. The output of the second Schmitt trigger circuit is adapted to be taken out directly and through an inverter 409. Thus, normally, the clipped rectified wave form appearing across the capacitor 405 is shaped by the first Schmitt trigger circuit 406, the integrating circuit 407 and the second Schmitt trigger circuit 408 into a high direct current level $\overline{ACOFF}$, and further through the inverter 409 into an inverted low direct current level ACOFF, as shown in FIG. 11A-$i$.

In operation, when the supply of the electric power from the power source to the load becomes possible, for example, by closing the main switch MS, the alternating current, input, shown in FIG. 11A-$a$, is introduced into the power source synchronizing signal generator 24 and transformed into a pair of rectangular wave signals SYNC and $\overline{SYNC}$ shown in FIG. 11A-$b$ and $c$ which are applied to the pair of trigger signal generators 26a and 26b. One of the rectangular wave signal $\overline{SYNC}$, is applied to the shift register 28 to first toggle the output of the first stage 28a and to toggle the output of the second stage 28b one cycle later, as shown in FIG. 11A-$f$ and $g$. Simultaneously, the output of the counter control circuit 30 is toggled thereby to generate a counter enable signal ON to the counter 321 of the counting device 32 and to the AND gate 342 of the counting device 34.

If the pulse counters 321 and 341 are equal in count, the comparator 36 will generate a coincidence signal COIN to the AND gate 342 to conduct the same, provided that the counters 321 and 341 receive the enable signal ON. Then the pulse counters 321 and 341 will simultaneously begin to synchronously count the clock pulses applied from the clock pulse generator 38 and be reset to zero by each rising edge of the rectangular wave signal SYNC and then repeat the same counting operations.

If the counts in the counters 321 and 341 are different from each other when the output ON is generated from the counter control circuit 30, the AND gate 342 will not generate an enable signal to the counter 341 and therefore the counter 341 will not perform the counting operation. Only the pulse counter 321 will perform the counting operation and it coincides in count with the counter 341 after which time both the counters 321 and 341 synchronously repeat counting and self-resetting operations. For example, if the recurrence frequency of the clock pulses from the clock pulse generator 38 is selected at 600 Hz when the frequency of the power source is 50 Hz, the pulse counters 321 and 341 will repeat the operation of counting from 0 to 16 for each cycle in synchronization with the alternating current input from the AC power source.

When the pulse counters 321 and 341 are equal in count, on the other hand, the coincidence signal COIN generated from the comparator 36 is also applied to the respective inputs of the trigger signal generators 26a and 26b. This causes the trigger signal generators 26a and 26b to generate and send the trigger signals alternately to the switches 22a and 22b thereby to switch the switches alternately to on-conditions in synchronization with the voltage or current of the power source, more particularly, at the points of zero voltage or current of the power source, and to feed the AC-power to the load on condition that the rectangular wave signals displaced 180° in phase angle from each other from the synchronizing signal generator 24 and the clock pulses from the clock pulse generator are applied to the trigger signal generators 26a and 26b.

The power supply interruption detector 40 will produce an inverted step-like signal ACOFF at the same time as the supply of the alternating current input in interrupted by opening the source circuit or the main switch MS, or by the occurrence of a short circuit on the side of the power source.

The step-like signal $\overline{ACOFF}$ will be applied to and reset the shift resistor 28. Simultaneously, it will be applied to and toggle the output of the counter control circuit 30. This causes the pulse counters 321 and 341 to be disenabled. The counter 341 holds its count at that time whereas the counter 321 is reset by the rising edge of the step-like signal ACOFF from the interruption detector 40.

If the input interruption occurs at a phase angle $\theta_1$ as shown in FIG. 11A-$a$ and if the corresponding count in the pulse counter 341 at this time is for example "7", the pulse counter 341 will be disenabled and hold the count thereafter. In other words, the pulse counter 341 will memorize the count "7" as the phase angle of the voltage or current of the power source at the time of the alternating input interruption.

If the supply of the power becomes again possible, for example, by reclosing the main switch MS or the source circuit or by the recovery from the short circuit on the side of the power source at a left-hand and phase angle $\theta_2$ as shown in FIG. 11B-$j$, the synchronizing signal generator 24 will again produce a pair of rectangular wave signal trains one of which, i.e., SYNC, is shown in FIG. 11B-$k$. The first rise edge of the rectangular wave signal SYNC will toggle the output of the first state 28a of the shift register 28 (FIG. 11B-$l$) and the second rise edge of the rectangular wave signal the output of the second stage 28b (FIG. 11B-$m$).

The toggled output of the resistor 28 (FIG. 11B-*m*) will toggle the output of the counter control circuit 30. The toggled output ON from the circuit 30 (FIG. 11B-*n*) is applied to the pulse counter 321 and the AND gate 342 as the respective enable signals. In this case, although the counter 321 is enabled, the AND gate 342 does not transmit since the coincidence signal COIN is not sent to it from the comparator 36. Thus, only the pulse counter 321 immediately begins to count from zero up while the pulse counter 341 holds the count "7" at the time of the alternating current input interruption.

When the count in the pulse counter 321 reaches "7" corresponding to the phase angle $\theta_3$ of the voltage or current (FIG. 11B-*j*), the comparator 36 will produce a coincidence signal COIN to make the AND gate 342. Thus, the pulse counters 321 and 341 count together from 8 to 16 and thereafter repeat the operation of counting synchronously from 0 to 16 for each cycle in synchronization with the alternating current input. This will cause the trigger signal generators 26*a* and 26*b* to generate the trigger signals as shown in FIG. 11B-*o* and *p* to the switches 22*a* and 22*b*. Thus, the load will again be fed with power at substantially the same phase angle $\theta'_3$ as that $\theta_3$ at the time of the alternating input interruption, as shown in FIG. 11B-*q*.

The reason why the shift register 28 is of a two-stage type is that the counting of the clock pulses corresponding to the phase angles of the source voltage or current and therefore of the rectangular wave signal should be restarted at the leading rise edge of the second pulse of the rectangular wave signal since the rectangular wave signal has been generated again. Otherwise, if the shift register should, for example, be of the one stage type, the counter 321 would restart its counting operation as soon as the supply of power becomes possible again. This would undesirably lead to restarting the power supply from the power source to the load at a phase angle different from that at the time of the interruption of the power supply.

As described above, according to the present invention, the phase angle of the voltage or current of the alternating current input at its interruption is automatically memorized and, after the power supply becomes again possible, a time is detected when the frequency of the AC power source has the same phase angle as that at the interruption at which time power is again applied to the load, as shown in FIG. 11B-*q*, to effectively protect the load from transient phenomenon damages owing to the interruption and the later recovery of the power supply.

The accuracy with which the phase angle of the alternating current input at the time of its interruption is detected can be improved by increasing the recurrence frequency of the pulses generated from the clock pulse generator 38.

In the particular embodiment, several articles manufactured by Texas Instruments Incorporated and commercially available are used, which are identified by this type numbers in the drawings.

The electrical phase control switches 22*a* and 22*b* may be of any other type well-known so long as they can control the phase angle of the voltage or current of the power source.

The apparatus of the present invention may be constructed by the use of other well-known logic elements than those disclosed above.

It is thought that the invention and its numerous attendant advantages will be fully understood from the foregoing description, and it is obvious that numerous changes may be made in the form, construction and arrangement of the several parts without departing from the spirit or scope of the present invention, or sacrificing any of its attendant advantages, the form herein disclosed being a preferred embodiment for the purpose of illustrating the invention.

What is claimed is:

1. Apparatus for preventing occurrence of possible transient phenomena in a circuit including an alternating current power source and a load connected thereto when the supply of electric power from said power source to said load, which has been interrupted, is restarted, said apparatus comprising:
   (a) switching means provided in said circuit between said power source and said load;
   (b) means for generating trigger signals to operate said switching means in synchronization with the voltage or current of said power source for supplying power from said power source to said load in a smooth manner;
   (c) means for detecting a possible occurrence of interruption of the power supply;
   (d) means responsive to the detecting of the interruption of the power supply by said detecting means for memorizing the phase angle of the current or voltage of said power source at the time of the occurrence of the interruption of the power supply to stop the operation of said trigger signal generating means and to turn off said switching means; and
   (e) means for detecting the coincidence of the phase angle memorized in said memorizing means with a changing phase angle of the voltage or current of said power source after the power supply from said power source to said load becomes again possible to restart the operation of said trigger signal generating means and therefore said switching means at the time of detecting the coincidence.

2. Apparatus according to claim 1, wherein said switching means includes a pair of reverse blocking triode thyristors connected oppositely parallel with each other.

3. Apparatus according to claim 1, wherein said switching means includes a bidirectional triode thyristor.

4. Apparatus according to claim 1, further including means for generating a pair of rectangular wave trains 180° out of phase in synchronization with the voltage or current of said power source in order that the trigger signals from said trigger signal generating means are 180° out of phase from each other and in synchronization with the voltage or current of said power source, each of the trigger signals consisting of a plurality of pulses spaced equally for every other half cycle of one of the rectangular wave trains of the pair.

5. Apparatus according to claim 4, wherein said rectangular wave trains generating means includes a first circuit for connecting across said power source, said first circuit comprising a pair of first diodes connected in series so that their cathodes are connected together and their anodes are respectively connected to opposite-polarity terminals of said power source, a pair of second circuits connected respectively in parallel with said first diodes of said first circuit, each second circuit consisting of a second diode, a resistor of relatively high resistance and a Zener diode connected in series in such a manner that said second diode and said Zener diode are respectively opposite to and the same as a corresponding first diode in polarity, the cathodes of said Zener diodes and of said first diodes being connected together to a predetermined positive clamping potential having a magnitude substantially equal to the Zener voltages of said Zener diodes, and a flip-flop having inputs respectively connected to the anodes of said Zener diodes, said flip-flop switching its output when said Zener diodes are respectively turned on against their Zener voltages, thereby generating said pair of rectangular wave trains 180° out of phase.

6. Apparatus according to claim 4, wherein said coincidence detecting means includes a two-stage shift register responsive to two successive rise or fall edges of rectangular wave train of one of said pair for producing an output, means responsive to the output of said shift register for producing a lasting enable signal, first counting means responsive to the enable signal of said enable signal producing means for counting recurring clock pulses having a period of one over an integral multiple of the frequency of the voltage or current of said power source, said memorizing means including a second counting means for counting the recurring clock pulses in synchronization with said first counting means, and means for stopping the counting operation of said second counting means at the time of the occurrence of the interruption of the power supply to hold the count in said memorizing means at that time, said coincidence detecting means further including means for detecting the coincidence between the counts of said first and second counting means to again start the operation of said trigger signal generating means.

7. Apparatus according to claim 6 wherein said shift register comprises first and second J-K type flip-flops connected in cascade, said first J-K type flip-flop having J and K terminals connected to a predetermined potential and having outputs connected to the J and K input terminals of said second flip-flop, both said first and second flip-flops having clock control input terminals for receiving one of said rectangular wave trains synchronized with the voltage or current of said power source, and a D-type flip-flop having a clock control input terminal connected to the output of said second flip-flop and having a D input terminal connected to a predetermined potential.

8. Apparatus according to claim 6, wherein said first and second counting means are reset normally for each cycle of the rectangular wave train of one of said pair.

9. Apparatus according to claim 6, wherein said counting operation stopping means comprises an AND gate for receiving the outputs of said coincidence detecting means and of said enable signal producing means.

10. Apparatus according to claim 6 wherein said power supply interruption detecting means resets said shift register, said enable signal producing means and said first counting means, at the time of detecting the interruption of the power supply.

11. Apparatus according to claim 10, wherein said power supply interruption detecting means includes means for rectifying full waves of the voltage of said power source, means for clipping the rectified full waves to a predetermined level, means for integrating the clipped rectified full waves, and means for shaping the output of said integrating means to produce a step-like reset output at the time of detecting the interruption of the power supply.

12. Apparatus according to claim 7, wherein said trigger signal generating means comprises a pair of NAND gates for respectively receiving as inputs the rectangular wave trains 180° out of phase angle, each of said NAND gates of the pair further receiving the outputs of said coincidence detecting means and the recurring clock pulses.

* * * * *